(12) United States Patent
Wang et al.

(10) Patent No.: US 10,079,509 B2
(45) Date of Patent: Sep. 18, 2018

(54) FREE-RESONANCE ANALOG PING FOR WIRELESS POWER TRANSMISSION

(71) Applicant: Freescale Semiconductor, Inc., Austin, TX (US)

(72) Inventors: Dechang Wang, Suzhou (CN); Changhao Shi, Suzhou (CN); Li Wang, Suzhou (CN)

(73) Assignee: NXP USA, INC., Austin, TX (US)

( * ) Notice: Subject to any disclaimer, the term of this patent is extended or adjusted under 35 U.S.C. 154(b) by 347 days.

(21) Appl. No.: 14/867,002

(22) Filed: Sep. 27, 2015

(65) Prior Publication Data

US 2016/0268842 A1    Sep. 15, 2016

(30) Foreign Application Priority Data

Mar. 13, 2015 (CN) .......................... 2015 1 0254739

(51) Int. Cl.
  *H02J 50/12* (2016.01)
  *H02J 9/00* (2006.01)
(52) U.S. Cl.
  CPC .............. *H02J 50/12* (2016.02); *H02J 9/005* (2013.01)
(58) Field of Classification Search
  CPC .................................. H02J 50/12; H02J 9/005
  See application file for complete search history.

(56) References Cited

U.S. PATENT DOCUMENTS

| | | | |
|---|---|---|---|
| 2009/0140691 A1 | 6/2009 | Jung | |
| 2012/0028144 A1* | 2/2012 | Tanaka | H01M 8/04223 429/423 |
| 2012/0112543 A1* | 5/2012 | Van Wageningen | H02J 7/025 307/43 |
| 2012/0256620 A1 | 10/2012 | Oettinger | |
| 2012/0268238 A1* | 10/2012 | Park | G07F 15/006 340/5.8 |
| 2012/0313577 A1* | 12/2012 | Moes | H04B 5/0037 320/108 |
| 2013/0119929 A1 | 5/2013 | Partovi | |
| 2013/0225077 A1* | 8/2013 | Schultz | H02J 7/025 455/41.1 |
| 2014/0077617 A1* | 3/2014 | Nakano | H02J 5/005 307/104 |

(Continued)

*Primary Examiner* — Alfonso Perez Borroto
*Assistant Examiner* — Esayas Yeshaw
(74) *Attorney, Agent, or Firm* — Charles E. Bergere

(57) ABSTRACT

A wireless transmitter wirelessly charges/powers a wireless receiver. The transmitter performs an analog ping to tentatively detect a device. During an energizing phase of the analog ping, the transmitter applies power pulses to a resonant circuit within the transmitter, where, after application of the power pulses, the resonant circuit enters a free-resonance state of a resonating phase of the analog ping that follows the energizing phase. During the resonating phase, while the resonant circuit is in the free-resonance state, the transmitter samples voltage within the resonant circuit to generate one or more voltage-level samples. The transmitter processes the voltage-level samples to tentatively detect the device. If a device is tentatively detected then the transmitter performs a digital ping to definitively determine whether the device is present. If definitively detected then the transmitter wirelessly charges/powers the wireless receiver.

19 Claims, 5 Drawing Sheets

(56) References Cited

U.S. PATENT DOCUMENTS

| | | | | |
|---|---|---|---|---|
| 2014/0097791 A1* | 4/2014 | Lisuwandi | ............ | H01F 38/14 |
| | | | | 320/108 |
| 2014/0163762 A1* | 6/2014 | Nakamura | ............... | H02J 3/32 |
| | | | | 700/295 |
| 2014/0306657 A1* | 10/2014 | Lundgren | ............... | H02J 7/025 |
| | | | | 320/108 |
| 2015/0333530 A1* | 11/2015 | Moyer | ................... | H02J 7/025 |
| | | | | 307/104 |
| 2015/0357825 A1* | 12/2015 | Wortel | ................... | H02J 50/60 |
| | | | | 307/104 |
| 2016/0190818 A1* | 6/2016 | He | ......................... | H02J 50/10 |
| | | | | 307/104 |
| 2016/0254705 A1* | 9/2016 | Jung | ...................... | H02J 50/12 |
| | | | | 307/104 |
| 2016/0336807 A1* | 11/2016 | Mach | ..................... | H02J 5/005 |

* cited by examiner

FREE-RESONANCE ANALOG PING FOR WIRELESS POWER TRANSMISSION

BACKGROUND

The present invention relates to electronics and, more particularly, to analog ping techniques for wireless charging and powering of wireless receivers.

Wireless energy transfer or wireless power is the transmission of electrical energy from a power source to an electrical load without interconnecting wires. Such wireless charging is useful in cases where interconnecting wires are inconvenient, hazardous, or costly. Efficiency is an important parameter of wireless charging.

A common form of coupling used in wireless charging is inductive coupling. A wireless charging system usually includes electromagnetically coupled transmitting and receiving coils. Energy from the primary side is transferred to the secondary side over a distance using the coil coupling. Electromagnetic induction wireless charging techniques are near field over distances comparable to a few times the diameter of the device or devices approaching one quarter of the wavelength used.

Electromagnetic induction works on the principle of a primary coil generating a predominantly magnetic field and a secondary coil being within that field so that a current is induced in the secondary coil. Coil coupling should meet the Qi specification requirements. As the distance from the primary coil is increased, more and more of the magnetic field misses the secondary coil. Even over a relatively short range, the induction method is rather inefficient, wasting much of the transmitted energy.

Common uses of inductive coupling chargers are charging the batteries of portable devices such as laptop computers, cell phones, medical implants, and electric vehicles. Resonant converters may be used in both the wireless charging pad (the transmitter circuit) and the receiver module (embedded in the load) to maximize energy transfer efficiency. This approach is suitable for universal wireless charging pads for portable electronics such as mobile phones. It has been adopted as part of the Qi wireless charging standard. It is also used for powering devices having no batteries, such as RFID patches and contactless smartcards, and to couple electrical energy from the primary inductor to the helical resonator of Tesla coil wireless power transmitters.

Inductive charging occurs when two devices—one designed to transmit power and the other to receive power—come close to one another and energy is transferred between them. The power transmitting device projects an electromagnetic field. If the receiver is placed within that electromagnetic field, power is transferred from the transmitter to the receiver. The receiver can be a power supply for any load. For example, charging pads can intelligently communicate back and forth with the devices they are charging using the electromagnetic field. In this application, the electromagnetic field used to transfer energy is modulated, allowing communication between the charging pad and the device it is charging. However, it is not always evident to the transmitting device whether there is an appropriate receiver within the electromagnetic field. Therefore, it would be useful to determine if an object were present in the electromagnetic field.

Two different types of techniques have been used to determine whether a wireless receiver to be charged is present, i.e., close enough to be wirelessly charged by the wireless transmitter, 1) digital ping techniques and 2) analog ping techniques. In digital ping techniques, the wireless transmitter attempts to communicate with the wireless receiver to determine whether or not the wireless receiver is present. Unfortunately, digital ping techniques tend to consume a significant amount of power.

In analog ping techniques, the wireless transmitter generates an electromagnetic field that is affected by the presence of the wireless receiver. The wireless transmitter determines that the wireless receiver is present by detecting the impact that the affected electromagnetic field has on its own operations. Analog ping techniques consume less power than digital ping techniques. Unfortunately, analog ping techniques are susceptible to false positive determinations when certain types of foreign objects other than the desired wireless receiver are brought near the wireless transmitter.

Conventional wireless transmitters are designed to perform both analog and digital ping techniques. These conventional wireless transmitters repeatedly perform analog pings until the wireless transmitter determines that a wireless receiver is present. The wireless transmitter then performs a digital ping to confirm whether or not the wireless receiver is actually present.

BRIEF DESCRIPTION OF THE DRAWINGS

Other embodiments of the invention will become more fully apparent from the following detailed description, the appended claims, and the accompanying drawings in which like reference numerals identify similar or identical elements.

DETAILED DESCRIPTION

Figure 1:
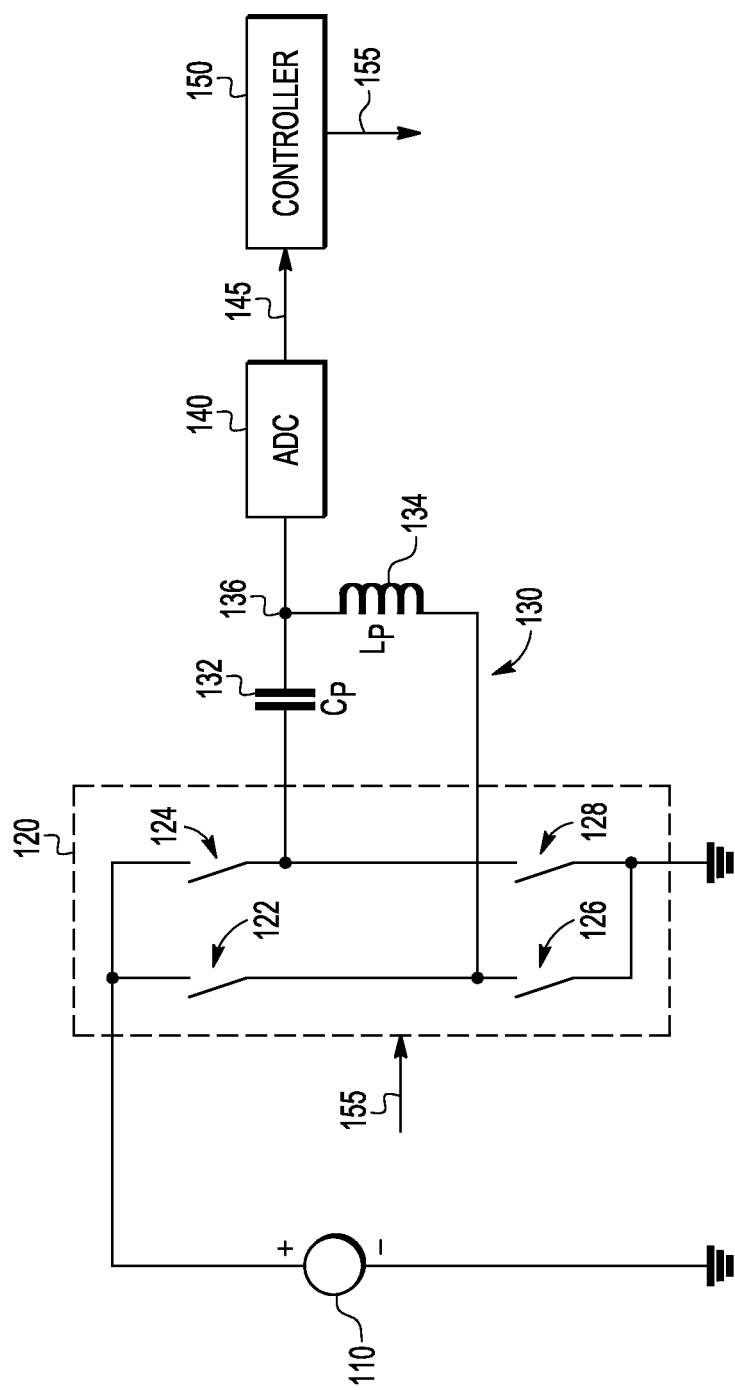
FIG. 1 is a simplified schematic diagram of a portion of a wireless transmitter according to one embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the invention is a method for wirelessly charging or powering a wireless receiver by a wireless transmitter. The wireless transmitter performs an analog ping to tentatively determine whether the wireless receiver is present. During an energizing phase of the analog ping, the wireless transmitter applies one or more power pulses to a resonant circuit within the wireless transmitter. After application of the one or more power pulses, the resonant circuit enters a free-resonance state of a resonating phase of the analog ping that follows the energizing phase. During the resonating phase, while the resonant circuit is in the free-resonance state, the wireless transmitter samples a voltage within the resonant circuit one or more times to generate one or more voltage-level samples. The wireless transmitter processes the voltage-level samples to tentatively determine whether the wireless receiver is present. If the wireless transmitter tentatively determines that the wireless receiver is present, then the wireless transmitter performs a digital ping to definitively determine the presence of the wireless receiver. If the wireless transmitter definitively determines that the wireless receiver is present, then the wireless transmitter wirelessly charges the wireless receiver.

In another embodiment, the invention is wireless transmitter for charging a wireless receiver. The wireless transmitter comprises a resonant circuit and a controller. The controller performs an analog ping to tentatively determine whether the wireless receiver is present. During an energizing phase of the analog ping, the controller causes one or more power pulses to be applied to the resonant circuit, and after application of the power pulses, the resonant circuit enters a free-resonance state of a resonating phase of the analog ping that follows the energizing phase. During the resonating phase, while the resonant circuit is in the free-resonance state, the controller causes a voltage within the resonant circuit to be sampled one or more times to generate one or more voltage-level samples. The controller processes the voltage-level samples to tentatively determine whether the wireless receiver is present. If the controller tentatively determines that the wireless receiver is present, then the controller performs a digital ping to definitively determine whether the wireless receiver is present. If the controller definitively determines that the wireless receiver is present, then the controller causes the wireless transmitter to wirelessly charge the wireless receiver.

Referring now to FIG. 1, a simplified schematic diagram of a portion of a wireless transmitter 100 according to one embodiment of the invention is shown. The wireless transmitter 100 is designed to (i) perform one or more analog pings to provide tentative determination that a wireless receiver (not shown) to be wirelessly charged is present, (ii) perform a digital ping to provide definitive determination that a tentatively detected wireless receiver is in fact present, and (ii) wirelessly charge a wireless receiver after definitively determining that the wireless receiver is present. The circuitry shown in FIG. 1 is related to the function of performing the analog pings. Not shown in FIG. 1 is the circuitry related to the function of performing the digital ping as well as the circuitry related to the function of wirelessly charging the wireless receiver. Nevertheless, in certain implementations, some of the circuitry shown in FIG. 1 may be used to support one or both of those other functions.

The wireless transmitter 100 includes a DC power supply 110, a full-bridge inverter 120 including switches 122-128, a capacitor 132, an inductor 134, an analog-to-digital converter (ADC) 140, and a controller 150. The states of the switches 122-128 are controlled by control signals 155 generated by the controller 150. The controller 150 can be implemented using any suitable hardware or software based processor. The capacitor 132 and the inductor 134 form a tank circuit 130.

To perform an analog ping, the controller 150 controls the states of the switches 122-128 to apply one or more power pulses to the capacitor 132 and the inductor 134 to establish, after the last power pulse, a free-resonance state in the tank circuit 130, where the term "free" refers to the fact that the tank circuit 130 continues to resonate on its own without applying any additional power pulses. The ADC 140 samples the voltage at the node 136 and provides one or more voltage-level samples 145 to the controller 150, which processes those one or more voltage-level samples 145 to tentatively determine whether a wireless receiver to be wirelessly charged is present.

There are two different ways to configure the switches 122-128 to energize the tank circuit 130. One way to energize the tank circuit 130 is to close the switches 122 and 128 and open the switches 124 and 126. Another way to energize the tank circuit 130 is to close switches 124 and 126 and open switches 122 and 128.

There are also two different ways to configure the switches 122-128 to configure the tank circuit 130 to resonate freely. Note that, even if the tank circuit 130 is configured to resonate freely, the tank circuit 130 will resonate only if the tank circuit 130 has been sufficiently energized to achieve resonance. Nevertheless, the configurations of the switches 122-128 that enable the tank circuit 130 to resonate freely will be referred to herein as configurations of the tank circuit 130 "for free-resonance," whether or not the tank circuit 130 has enough energy to resonate. One way to configure the tank circuit 130 for free-resonance is to close switches 122 and 124 and open switches 126 and 128. Another way to configure the tank circuit 130 for free-resonance is to close switches 126 and 128 and open switches 122 and 124.

When the tank circuit 130 is configured for free-resonance (in one of the two ways mentioned previously), the application of a power pulse to the tank circuit 130 is initiated by re-configuring the switches 122-128 in one of the two ways mentioned previously to energize the tank circuit 130, and the power pulse is terminated by re-configuring the switches 122-128 in one of the two ways mentioned previously for free-resonance.

Figure 2:
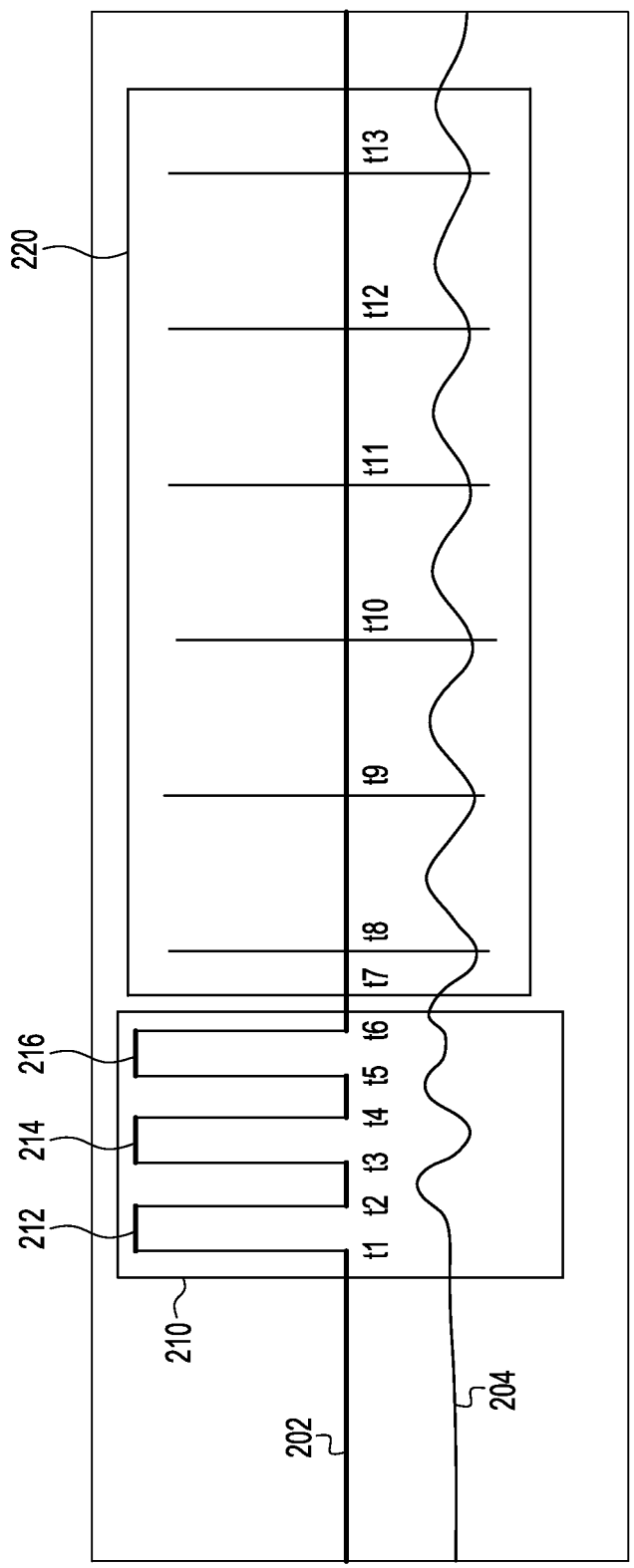
FIG. 2 is a timing diagram illustrating one possible implementation of an analog ping when no interfering object is near the wireless transmitter of FIG. 1.

FIG. 2 is a timing diagram illustrating one possible implementation of an analog ping by the wireless transmitter 100 of FIG. 1. Curve 202 represents power applied by the power supply 110 to the capacitor 132 and the inductor 134, and curve 204 represents the voltage at node 136. The analog ping of FIG. 2 has two phases: an initial, energizing phase corresponding to the box 210 of FIG. 2 and a subsequent, resonating phase corresponding to the box 220 of FIG. 2.

During the energizing phase of the analog ping of FIG. 2, the controller 150 controls the states of the switches 122-128 to apply three power pulses 212, 214, and 216 to the capacitor 132 and the inductor 134. Note that, in other implementations, analog pings may have any suitable number of power pulses, including only one. The number, timing, and size of the power pulses are selected to enable the tank circuit 130 to achieve a suitable free-resonance state after the pulses have been applied.

During the resonating phase of the analog ping of FIG. 2, the tank circuit 130 is in a free-resonance state, and the ADC 140 samples the voltage at the node 136 at six different times to generate six different voltage-level samples 145 that are processed by the controller 150. Note that, in other implementations, analog pings may generate any suitable number of voltage-level samples at different suitable times.

In particular, prior to time t1, the switches 122-128 are configured to configure the tank circuit for free-resonance, but the tank circuit 130 does not have enough energy to resonate. At time t1, the switches 122-128 are re-configured to begin the first power pulse 212 during which the tank circuit 130 is energized. At time t2, the switches 122-128 are re-configured to end the first power pulse 212.

Similarly, at time t3, the switches 122-128 are re-configured to begin the second power pulse 214 during which the tank circuit 130 is further energized. At time t4, the switches 122-128 are re-configured to end the second power pulse 214.

Again, at time t5, the switches 122-128 are re-configured to begin the third power pulse 216 during which the tank circuit 130 is still further energized. At time t6, the switches 122-128 are re-configured to end the third power pulse 216.

Following time t6, the switches 122-128 are kept in that same configuration such that, by time t7, the tank circuit 130 will have settled into its characteristic free-resonance state. At each of times t8-t13, the ADC 140 samples the voltage at the node 136 and provides a corresponding voltage-level sample 145 to the controller 150.

When no wireless receiver or any other interfering metal foreign object is near the wireless transmitter 100, the tank circuit 130 will resonate, during its free-resonance state, with a characteristic amplitude and a characteristic frequency. This is the free-resonance state illustrated in FIG. 2. Note that, in FIG. 2, the sample times t8-t13 have been purposefully selected to correspond to the times when the voltage at the node 136 is at its minimum amplitude level when the tank circuit 130 is resonating at its characteristic frequency. In alternative implementations, the tank circuit 130 can be sampled at other times, for example, when the voltage at the node 136 is at its maximum amplitude level.

When a wireless receiver (or other interfering metal foreign object) is placed sufficiently near the wireless transmitter 100, the wireless receiver will interact electromagnetically with the magnetic field generated by the inductor 134 to alter the resonant amplitude and/or the resonant frequency of the tank circuit 130 in its free-resonance state. Note, as used above, sufficiently means near enough to cause an interaction (between the wireless transmitter and wireless receiver).

Figure 3:
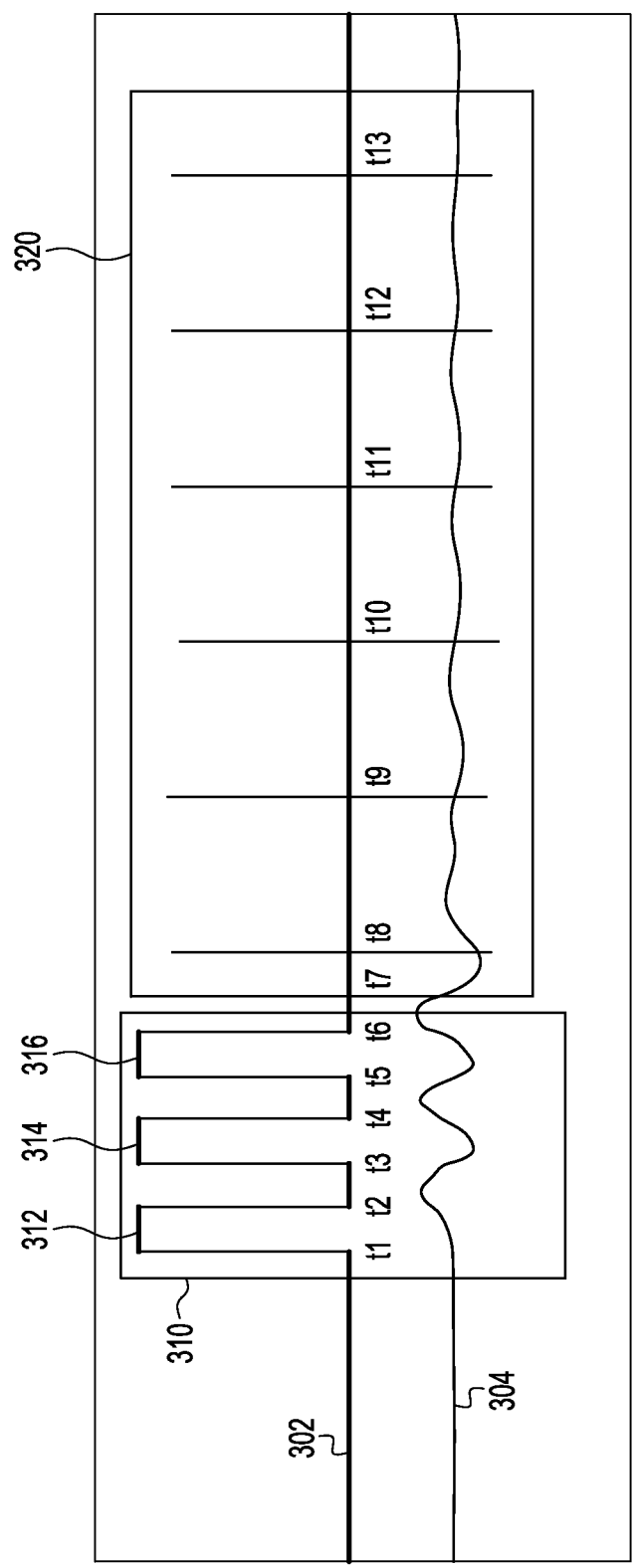
FIG. 3 is a timing diagram illustrating the analog ping of FIG. 2 after a wireless receiver (or other interfering foreign object) has been placed sufficiently near the wireless transmitter of FIG. 1.

FIG. 3 is a timing diagram illustrating the analog ping of FIG. 2 after a wireless receiver (or other interfering foreign object) has been placed sufficiently near the wireless transmitter 100 of FIG. 1. Note that, as shown in the curve 302, the three power pulses 312-316 applied in the box 310 of FIG. 3 are identical to the three power pulses 212-216 applied in the box 210 of FIG. 2, and six voltage-level samples 145 are generated at the same six sampling times t8-t13 as shown in the box 320 of FIG. 3. However, as shown in the curve 304 in the box 320 of FIG. 3, the presence of the wireless receiver results in the resonant amplitude and the resonant frequency of the tank circuit 130 during its free-resonance state to be different from those of the analog ping of FIG. 2. As a result, one or more of the six voltage-level samples 145 for the analog ping of FIG. 3 will differ from the corresponding voltage-level samples 145 for the analog ping of FIG. 2.

Depending on the particular implementation, the controller 150 can be designed to tentatively determine the presence of a wireless receiver during an analog ping based on either the resonant amplitude or the resonant frequency of the tank circuit 130 (or both) during its free-resonance state.

Figure 4:
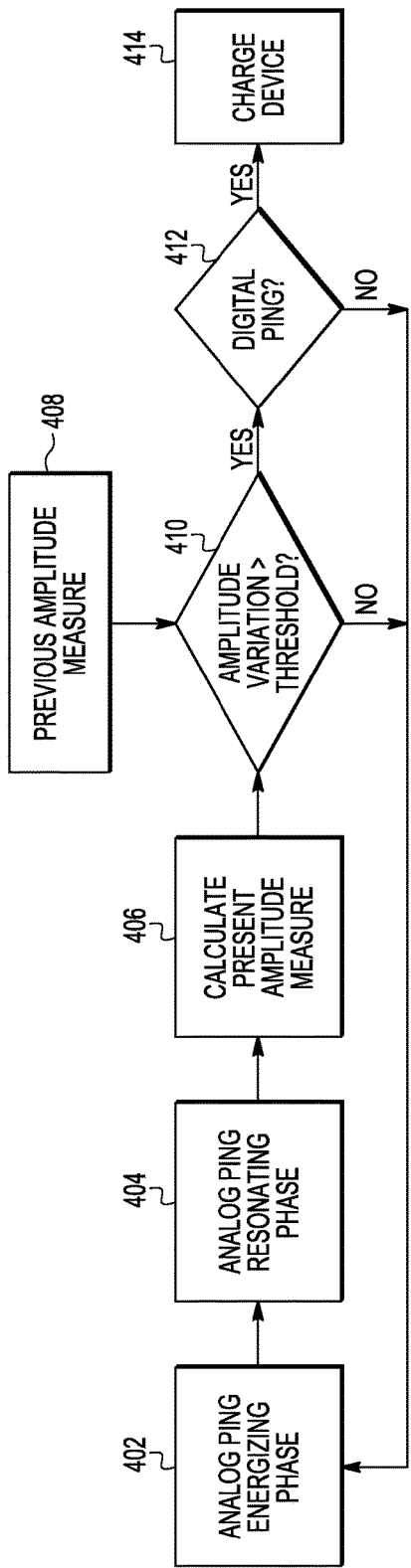
FIG. 4 is a flow chart of one possible implementation of the processing of the wireless transmitter of FIG. 1 in which the controller tentatively detects the presence of a wireless receiver based on the resonant amplitude of a tank circuit.

FIG. 4 is a flow chart of one possible implementation of the processing of the wireless transmitter 100 of FIG. 1 in which the controller 150 tentatively detects the presence of a wireless receiver based on the resonant amplitude of the tank circuit 130. In step 402, the energizing phase of the analog ping is implemented with one or more power pulses, as in FIGS. 2 and 3. In step 404, one or more voltage-level samples 145 are generated during the resonating phase of the analog ping, as in FIGS. 2 and 3.

In step 406, the controller 150 processes the voltage-level samples 145 to generate an amplitude measure. Depending on the particular implementation, the amplitude measure could be, for example, the sum of the voltage-level samples or an average voltage level. In step 410, the controller 150 compares the amplitude measure for the present analog ping with the amplitude measure for the previous analog ping of step 408. If the controller 150 determines that the present amplitude measure is sufficiently similar (i.e., about equal) to the previous amplitude measure, then the controller 150 determines that the wireless receiver is not present, and processing returns to step 402 to initiate another analog ping. Note that there may be a specified time delay before the start of the next analog ping.

If, however, the controller 150 determines that the present amplitude measure is sufficiently different from the previous amplitude measure, then the controller 150 tentatively determines that the wireless receiver is present, and processing proceeds to step 412, where a digital ping is performed to definitively determine whether the wireless receiver is present. Here, sufficiently different means different by more than a predetermined amount, where the predetermined amount may be determined empirically by iteratively moving a receiver closer to a transmitter. If the digital ping determines that the wireless receiver is not present, then processing returns to step 402 to initiate another analog ping. Here, too, there may be a specified time delay before the start of the next analog ping. If, however, the digital ping determines that the wireless receiver is present, then processing proceeds to step 414, where the wireless transmitter 100 wirelessly charges the wireless receiver using a suitable wireless charging technique. After the wireless receiver has been fully charged and/or removed from the wireless transmitter 100, processing will eventually return to step 402 to repeat the process for the next wireless charging scenario for the same wireless receiver or a different wireless receiver.

Assume, for example, that the processing of FIG. 4 is applied to a scenario in which a wireless receiver is moved from being relatively far away from the wireless transmitter 100 to being sufficiently close to the wireless transmitter 100 to enable the wireless receiver to be wirelessly charged by the wireless transmitter 100. Note that, with no nearby wireless receiver or other interfering metal object, the analog ping of FIG. 2 applies, and the present amplitude measure will be substantially equal to the characteristic minimum resonant amplitude for the tank circuit 130. Note, however, that, with the wireless receiver nearby, the analog ping of FIG. 3 applies, and the present amplitude measure will differ from the tank circuit's characteristic minimum resonant amplitude.

In this way, after the wireless receiver has been brought sufficiently close to the wireless transmitter 100, the controller 150 will detect a change in the amplitude measure from the previous analog ping to the present analog ping as a tentative determination that the wireless receiver is present. The analog ping will produce a positive result triggering the implementation of a digital ping to definitively determine whether the analog-ping result is a true positive (i.e., the wireless receiver is actually present) or a false positive (e.g., some other interfering foreign object is present).

Note that there are many ways that the controller 150 can be implemented to compare the present amplitude measure to the previous amplitude measure to detect a change in the resonant amplitude. For example, the magnitude of the absolute difference between the two amplitude measures can be compared to a specified threshold level. Alternatively, the magnitude of the relative difference between the two amplitude measures can be compared to a specified threshold level. In general, the more voltage-level samples 145 that are used to generate the amplitude measure, the more accurate will be the analog ping at detecting the presence of some interfering object. Note, however, that, in theory, the amplitude measure can be generated using any number of voltage-level samples, including only one.

Furthermore, instead of basing the previous amplitude measure on only the most-recent analog ping, the previous amplitude measure could be a filtered value generated by applying a suitable filter to multiple amplitude measures from a plurality of previous analog pings.

Note, further, that, instead of comparing the present amplitude measure to a previous amplitude measure determined from one or more previous analog pings, the controller 150 could be implemented to compare the present amplitude measure to a specified, a priori, characteristic amplitude value for the tank circuit 130.

Figure 5:
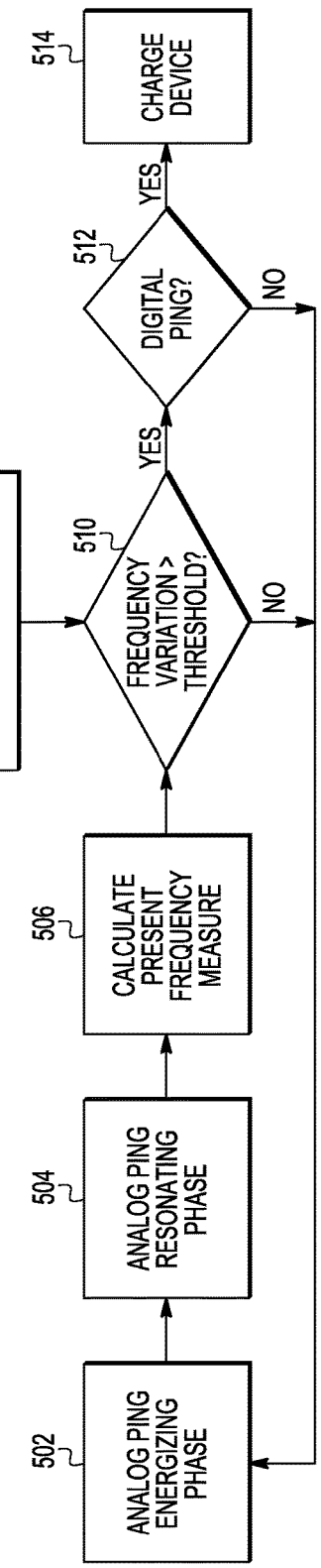
FIG. 5 is a flow chart of another possible implementation of the processing of the wireless transmitter of FIG. 1 in which the controller tentatively detects the presence of a wireless receiver based on the resonant frequency of a tank circuit.

FIG. 5 is a flow chart of one possible implementation of the processing of the wireless transmitter 100 of FIG. 1 in which the controller 150 tentatively detects the presence of a wireless receiver based on the resonant frequency of the tank circuit 130. In step 502, the energizing phase of the analog ping is implemented with one or more power pulses, as in FIGS. 2 and 3. In step 504, two or more voltage-level samples 145 are generated during the resonating phase of the analog ping, as in FIGS. 2 and 3.

In step 506, the controller 150 processes the two or more voltage-level samples 145 to generate a frequency measure. In one possible implementation, the frequency measure is determined using a conventional FFT (fast Fourier transform) technique. Those skilled in the art will understand that there are other ways of generating a frequency measure from the voltage-level samples 145. Note that possible frequency measures include phase or other frequency-related measures.

In step 510, the controller 150 compares the resonant frequency for the present analog ping with the resonant frequency for the previous analog ping of step 508. If the controller 150 determines that the present resonant frequency is sufficiently similar to the previous resonant frequency, then the controller 150 determines that the wireless receiver is not present, and processing returns to step 502 to initiate another analog ping. Note that there may be a specified time delay before the start of the next analog ping.

If, however, the controller 150 determines that the present frequency measure is sufficiently different from the previous frequency measure, then the controller 150 tentatively determines that the wireless receiver is present, and processing proceeds to step 512, where a digital ping is performed to definitively determine whether the wireless receiver is present. If the digital ping determines that the wireless receiver is not present, then processing returns to step 502 to initiate another analog ping. Here, too, there may be a specified time delay before the start of the next analog ping. If, however, the digital ping determines that the wireless receiver is present, then processing proceeds to step 514, where the wireless transmitter 100 wirelessly charges the wireless receiver using a suitable wireless charging technique. After the wireless receiver has been fully charged and/or removed from the wireless transmitter 100, processing will eventually return to step 502 to repeat the process for the next wireless charging scenario for the same wireless receiver or a different wireless receiver.

As before, assume, for example, that the processing of FIG. 5 is applied to a scenario in which a wireless receiver is moved from being relatively far away from the wireless transmitter 100 to being sufficiently close to the wireless transmitter 100 to enable the wireless receiver to be wirelessly charged by the wireless transmitter 100. Note that, with no nearby wireless receiver, the analog ping of FIG. 2 applies, and the present frequency measure will be substantially equal to the characteristic resonant frequency for the tank circuit 130. Note, however, that, with the wireless receiver nearby, the analog ping of FIG. 3 applies, and the present frequency measure will differ from the tank circuit's characteristic resonant frequency.

In this way, after the wireless receiver has been brought sufficiently close to the wireless transmitter 100, the controller 150 will detect a change in the frequency measure from the previous analog ping to the present analog ping as a tentative determination that the wireless receiver is present. The analog ping will produce a positive result triggering the implementation of a digital ping to definitively determine whether the analog-ping result is a true positive (i.e., the wireless receiver is actually present) or a false positive (e.g., some other interfering foreign object is present).

Note that there are many ways that the controller 150 can be implemented to compare the present frequency measure to the previous frequency measure to detect a change in the resonant frequency. For example, the magnitude of the absolute difference between the two frequency measures can be compared to a specified threshold level. Alternatively, the magnitude of the relative difference between the two frequency measures can be compared to a specified threshold level. In general, the more voltage-level samples 145 that are used to generate the frequency measure, the more accurate will be the analog ping at detecting the presence of some interfering object. Note, however, that, in theory, the frequency measure can be generated using any multiple number of voltage-level samples, including only two.

Furthermore, instead of basing the previous frequency measure on only the most-recent analog ping, the previous frequency measure could be a filtered value generated by applying a suitable filter to multiple frequency measures from a plurality of previous analog pings.

Note, further, that, instead of comparing the present frequency measure to a previous frequency measure determined from one or more previous analog pings, the controller 150 could be implemented to compare the present frequency measure to a specified, a priori, characteristic frequency value for the tank circuit 130.

Although the invention has been described in the context of FIGS. 4 and 5, in which analog pings are based on either the resonant amplitude or the resonant frequency, it is possible to implement a hybrid technique in which analog pings are based on both the resonant amplitude and the resonant frequency. In one such hybrid technique, sufficient changes in both the resonant amplitude and the resonant frequency must be detected before an analog ping produces a positive result. In another hybrid technique, a sufficient change in either one of the resonant amplitude and the resonant frequency will produce a positive result for an analog ping.

In the particular embodiment shown in FIG. 1, the wireless transmitter 100 has a single capacitor 132 and a single inductor 134 used to form the tank circuit 130. In alternative embodiments, a wireless transmitter could have two or more different, selectable capacitors and two or more different, selectable inductors that can be selectively configured to form different tank circuits having different resonant amplitudes and/or different resonant frequencies.

In the particular embodiment shown in FIG. 1, the wireless transmitter 100 has the tank circuit 130 comprising the capacitor 132 and the inductor 134. In alternative embodiments, a wireless transmitter could have other suitable types of resonant circuits other than the LC tank circuit 130, such as LCC or LLC resonant circuits.

Similarly, although the wireless transmitter 100 employs the full-bridge inverter 120 to control the energizing of the tank circuit 130, alternative embodiments may employ other suitable types of circuitry, such as a half-bridge inverter having only two switches.

Figure 6:
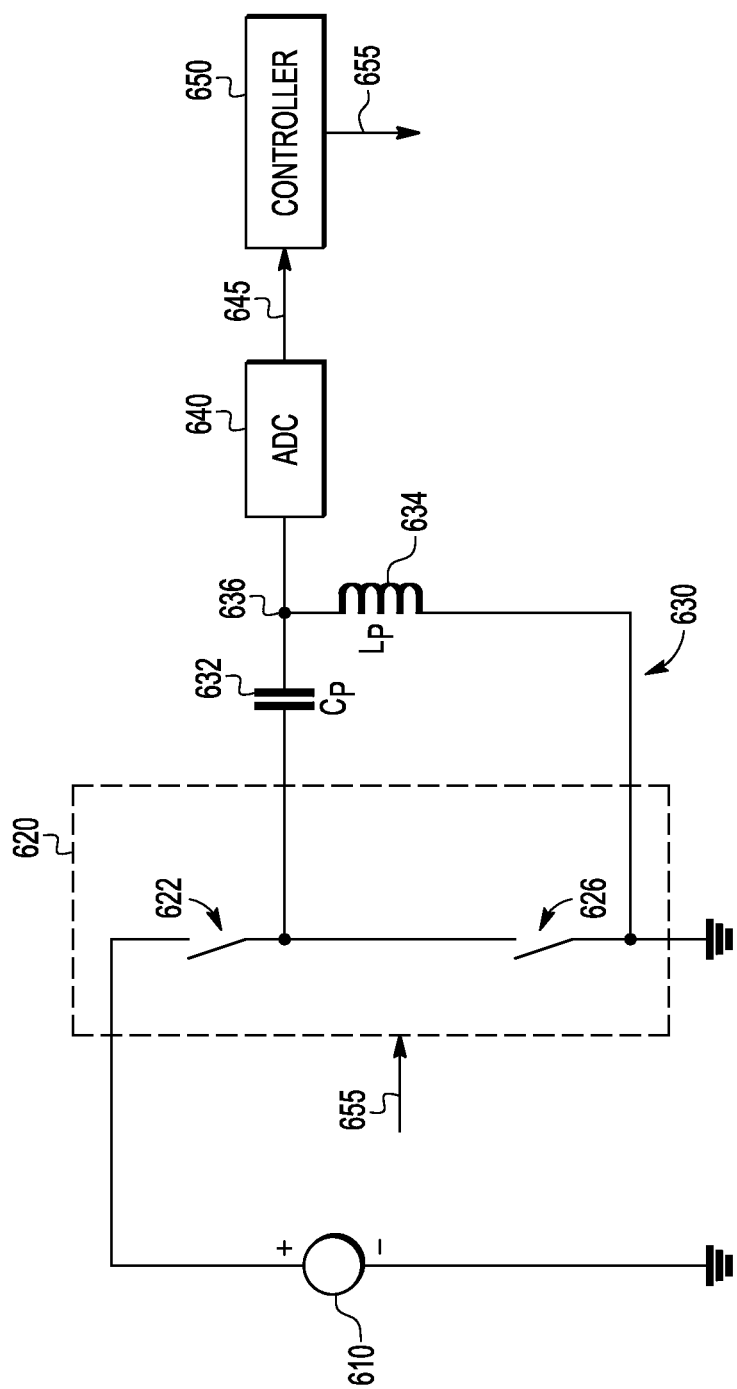
FIG. 6 is a simplified schematic diagram of a portion of a wireless transmitter according to another embodiment of the invention.

FIG. 6 is a simplified schematic diagram of a portion of a wireless transmitter 600 according to another embodiment of the invention. The wireless transmitter 600 is similar to the wireless transmitter 100 of FIG. 1 with elements 610-655 being analogous to corresponding elements in FIG. 1, except that the wireless transmitter 600 has a half-bridge inverter 620 having only two switches 622 and 626, instead of the full-bridge inverter 120 of FIG. 1, which has the six switches 122-128. In the wireless transmitter 600, the tank circuit 630 is energized by closing switch 622 and opening switch 626, and the tank circuit 630 is configured for free-resonance by opening switch 622 and closing switch 626.

Furthermore, in the particular embodiment shown in FIG. 1, the voltage at the node 136 is applied directly to the ADC 140. In alternative embodiments, the tank-circuit voltage may be applied to an ADC via a voltage divider.

In the particular embodiments represented in FIGS. 4 and 5, the analog ping tentatively detects a wireless receiver based on resonant amplitude and/or resonant frequency. In alternative embodiments, an analog ping tentatively detects a wireless receiver based on some other tank-circuit characteristic, such as Q value, instead of or in addition to resonant amplitude and/or resonant frequency.

Although the invention has been described in the context of wireless charging of a wireless receiver having a local power supply, such as a rechargeable battery, the invention can also be applied in the context of wireless powering of wireless receivers such as RFID tags and wireless smartcards that do not have a local power supply.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes, ports, or paths may be referred to by the same name and are interchangeable for purposes here.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A wireless transmitter for charging or powering a wireless receiver, the wireless transmitter comprising:
a resonant circuit comprising an inductor connected in series with a capacitor and having a node located between the inductor and the capacitor;

a plurality of switches connected between the resonant circuit and a power supply;
an analog to digital converter (ADC) connected to said node of the resonant circuit for sampling a voltage at said node; and
a controller connected to the ADC, wherein the ADC converts the voltage samples to a digital voltage samples input to the controller, and wherein:
the controller performs an analog ping to tentatively determine whether the wireless receiver is present, wherein:
(a) during an energizing phase of the analog ping, the controller controls the switches to cause one or more power pulses to be applied to the resonant circuit, wherein, after application of the pulses, the controller controls the switches so that the resonant circuit enters a free-resonance state of a resonating phase of the analog ping that follows the energizing phase;
(b) during the resonating phase, while the resonant circuit is in the free-resonance state, the controller causes the voltage at said node within the resonant circuit to be sampled one or more times to generate one or more voltage-level samples; and
(c) the controller processes the voltage-level samples to tentatively determine whether the wireless receiver is present;
(d) if the controller tentatively determines that the wireless receiver is present, then the controller causes a digital ping to be performed to definitively determine whether the wireless receiver is present; and
(e) if the controller definitively determines that the wireless receiver present, then the controller causes the wireless transmitter to wirelessly charge or power the wireless receiver.

2. The wireless transmitter of claim 1,
wherein when the wireless receiver is present, the inductor functions as a primary coil of a transformer whose secondary coil is part of the wireless receiver, such that the presence of the secondary coil alters at least one or resonant amplitude and resonant frequency of the tank circuit.

3. The wireless transmitter of claim 2, wherein the plurality of switches are configured to selectively (i) energize the tank circuit or (ii) configure the tank circuit for free-resonance, wherein, at the end of the energizing phase and throughout the resonating phase, the switches are configured such that the tank circuit is configured for free-resonance.

4. The wireless transmitter of claim 3, wherein:
during the resonating phase, the switches are configured so that no power pulses are applied to the resonant circuit;
the controller includes a comparator for comparing a present measure based on the one or more voltage-level samples to a previous measure based on one or more voltage-level samples from a previous analog ping to tentatively determine whether the wireless receiver is present, wherein the present measure is one of an amplitude measure or a frequency measure;
the controller tentatively determines whether the wireless receiver is present by determining whether resonant amplitude or frequency within the resonant circuit has changed by more than a predetermined amount;
if the present measure is the amplitude measure, then the controller determines the resonant amplitude with as few as one voltage-level sample; and
if the present measure is the frequency measure, then the controller determines the resonant frequency with as few as two voltage-level samples.

5. A method for wirelessly charging a wireless receiver by a wireless transmitter, comprising:
performing an analog ping, by the wireless transmitter, to tentatively determine whether the wireless receiver is present, wherein:
(a) initiating an energizing phase of the analog ping, wherein the wireless transmitter applies one or more power pulses to a resonant circuit within the wireless transmitter, wherein, after application of the one or more power pulses, the resonant circuit enters a free-resonance state of a resonating phase of the analog ping that follows the energizing phase;
(b) during the resonating phase, while the resonant circuit is in the free-resonance state, the wireless transmitter samples a voltage at a node within the resonant circuit one or more times to generate one or more voltage-level samples and converts the one or more voltage-level samples to a digital signal with an analog to digital converter; and
(c) the wireless transmitter processes the digital signal to tentatively determine whether the wireless receiver is present;
(d) if the wireless transmitter tentatively determines that the wireless receiver is present, then the wireless transmitter performs a digital ping to definitively determine whether the wireless receiver is present; and
(e) if the wireless transmitter definitively determines that the wireless receiver is present, then the wireless transmitter wirelessly charges or powers the wireless receiver.

6. The method of claim 5, wherein, during the resonating phase, no power pulses are applied to the resonant circuit.

7. The method of claim 5, wherein step (c) comprises the wireless transmitter comparing a present measure based on the one or more voltage-level samples to a previous measure based on one or more voltage-level samples from a previous analog ping to tentatively determine whether the wireless receiver is present.

8. The method of claim 7, wherein the present measure is an amplitude measure.

9. The method of claim 7, wherein the present measure is a frequency measure.

10. The method of claim 5, wherein the controller tentatively determines whether the wireless receiver is present by determining whether the resonant amplitude within the resonant circuit has changed by more than a predetermined amount.

11. The method of claim 10, wherein the wireless transmitter determines the resonant amplitude by summing or averaging two or more voltage-level samples.

12. The method of claim 5, wherein the wireless transmitter tentatively determines whether the wireless receiver is present by determining whether resonant frequency within the resonant circuit has changed by more than a predetermined amount.

13. The method of claim 12, wherein the wireless transmitter determines the resonant frequency using one or more voltage-level samples and by frequency transforming the one or more multiple voltage-level samples.

14. The method of claim 5, wherein the wireless transmitter tentatively determines whether the wireless receiver is present by determining whether both of resonant amplitude and resonant frequency within the resonant circuit have changed by more than respective predetermined amounts.

15. The method of claim 5, wherein the wireless transmitter tentatively determines whether the wireless receiver is present by determining whether either of resonant amplitude and resonant frequency within the resonant circuit has changed sufficiently.

16. The method of claim 5, wherein the resonant circuit is a tank circuit comprising:
an inductor; and
a capacitor connected in series with the inductor.

17. The method of claim 16, wherein the wireless transmitter further comprises a plurality of switches configurable to selectively (i) energize the tank circuit or (ii) configure the tank circuit for free-resonance, wherein, at the end of the energizing phase and throughout the resonating phase, the switches are configured such that the tank circuit is configured for free-resonance.

18. The method of claim 16, wherein, when the wireless receiver is present, the inductor functions as a primary coil of a transformer whose secondary coil is part of the wireless receiver, such that, the presence of the secondary coil alters at least one of a resonant amplitude and a resonant frequency of the tank circuit.

19. The method of claim 5, wherein:
during the resonating phase, no power pulses are applied to the resonant circuit;
step (c) comprises the wireless transmitter comparing a present measure based on the one or more voltage-level samples to a previous measure based on one or more voltage-level samples from a previous analog ping to tentatively determine whether the wireless receiver is present;
the present measure is one of an amplitude measure or a frequency measure;
the wireless transmitter tentatively determines whether the wireless receiver is present by determining whether resonant amplitude or frequency within the resonant circuit has changed by more than a predetermined amount;
if the present measure is the amplitude measure, then the wireless transmitter determines the resonant amplitude with as few as one voltage-level sample;
if the present measure is the frequency measure, then the wireless transmitter determines the resonant frequency with as few as two voltage-level samples;
the resonant circuit is a tank circuit comprising:
an inductor; and
a capacitor connected in series with the inductor;
the wireless transmitter further comprises a plurality of switches configurable to selectively (i) energize the tank circuit or (ii) configure the tank circuit for free-resonance, wherein, at the end of the energizing phase and throughout the resonating phase, the switches are configured such that the tank circuit is configured for free-resonance; and
when the wireless receiver is present, the inductor functions as a primary coil of a transformer whose secondary coil is part of the wireless receiver, such that the presence of the secondary coil alters at least one of resonant amplitude and resonant frequency of the tank circuit.

* * * * *